SEPARATE AMPLITUDE AND FREQUENCY MODULATOR CHANNELS FOR HIGH AND LOW SIGNALS TO PREVENT DISTORTION DUE TO CARRIER SUPPRESSION

Filed Dec. 9, 1963

SEPARATE AMPLITUDE AND FREQUENCY MODULATOR CHANNELS FOR HIGH AND LOW SIGNALS TO PREVENT DISTORTION DUE TO CARRIER SUPPRESSION

Filed Dec. 9, 1963

2 Sheets-Sheet 2

United States Patent Office 3,260,964

Patented July 12, 1966

3,260,964

SEPARATE AMPLITUDE AND FREQUENCY MODULATOR CHANNELS FOR HIGH AND LOW SIGNALS TO PREVENT DISTORTION DUE TO CARRIER SUPPRESSION

Cyril Cryer Whitehead, London, and Alan James Stanborough, Charlton, London, England, assignors to Associated Electrical Industries Limited, London, England, a British company Filed Dec. 9, 1963, Ser. No. 328,982
Claims priority, application Great Britain Dec. 14, 1962, 47,305/62
4 Claims. (Cl. 332—21)

This invention relates to frequency modulators for radio transmitters.

The invention is applicable both to transmission through the atmosphere and also to transmission along lines including waveguides and the term radio transmitter is intended to include both applications.

In a known method of frequency modulation the initial frequency deviation of the carrier can only be small to maintain linearity and hence a carrier which is at a relatively low frequency is phase modulated and the resulant phase modulated wave is then frequency multiplied. The carrier is suppressed subsequentially to the phase-modulation and only the sidebands are transmitted.

Suppression of the carrier can be carried out by a filter and such a filter will operate over a band and suppress some of the low frequency sidebands.

In certain applications this may be a disadvantage for example in cases in which it is desired to transmit a low frequency signal simultaneously with relatively higher frequency signals.

According to the present invention a frequency modulating circuit arrangement includes a carrier source feeding parallel channels including a first channel which includes means for amplitude modulating the carrier with relatively high frequency modulating signals and a filter for removing the carrier, a second channel which includes a $\pi/2$ phase shifting network and means for frequency modulating the carrier with relatively low frequency modulating signals and means for combining the outputs of the two channels for transmission.

It will be appreciated that whereas the main modulating signal suppresses the carrier the auxiliary circuit reintroduces it in quadrature in order to achieve phase modulation.

The invention has an important application in multi carrier equipment in which a supplementary signal termed an Engineering Order Wire signal is to be transmitted simultaneously.

In order that the invention may be more clearly understood reference will now be made to the accompanying drawings, in which.

Frequency modulation by means of initial phase-modulation has been known for some years and an example of a well known circuit is described in British patent specification No. 426,227. In the arrangement described in this patent the original carrier is modulated by a balanced modulator which adds a modulating component to the carrier, the modulating component having a phase shift of 90° relative to the carrier wave and an amplitude depending upon the amplitude of the modulating signal so that the sum of these two waves induces a resultant wave which has a phase shift relative to that of the original carrier depending upon the modulating signal.

Figure 2:
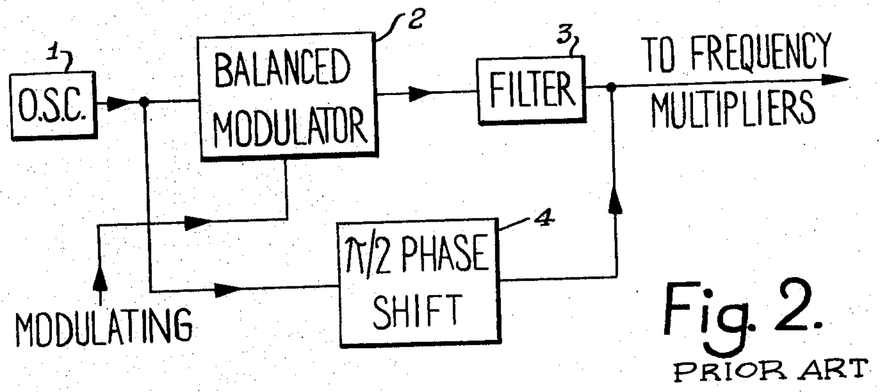
Fig. 2. PRIOR ART
FIG. 2 shows in block form a known form of phase modulator.

FIG. 2 shows in block form a modulator which is similar to that described in British Patent 426,227 excepting that in this case the original carrier from the oscillator 1 is amplitude modulated without phase change in balanced modulator 2 and then passed through a filter 3 to filter out the fundamental carrier leaving the side bands while at the same time there is an auxiliary branch circuit including a phase shifter 4 in which the carrier is shifted through 90° and then added on to the modulated signal, the resultant phase-modulated signal, as above explained, having its frequency multiplied up to that of a carrier suitable for transmission. It is well known that the balanced modulator will introduce side bands and it is important that the fundamental carrier component in phase with the modulating signal is removed leaving the side bands, after which the 90° phase shifted carrier may be reintroduced.

Figure 1:
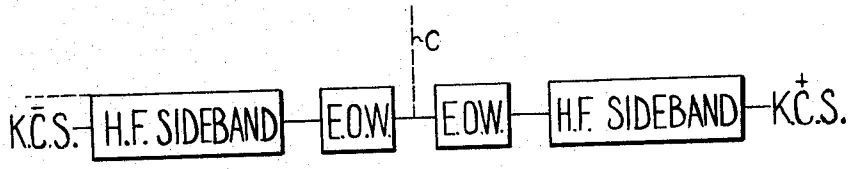
FIG. 1 shows graphically an example of the sidebands in the transmission of high frequency and low frequency signals simultaneously.

While this arrangement is perfectly suitable provided the modulation frequencies are high enough, difficulties can arise if low frequency modulating frequencies are to be transmitted as it is difficult to design a filter to eliminate only the fundamental carrier frequency without also removing some of the low frequency signals. An example of such an arrangement is shown in FIG. 1 in which the high frequency sidebands are those for a multi channel carrier transmission system and it is also desired to transmit Engineering Order Wire signals which will be at a much lower frequency. For example, the Engineering Order Wire or E.O.W. signals could extend over sidebands from 0.3 to 3.0 kilocycles per second and the high frequency side bands extend from 6 kilocycles per second upwards.

It will be readily appreciated that the filter to remove the fundamental carrier would also remove most of the E.O.W. signals.

Figure 3:
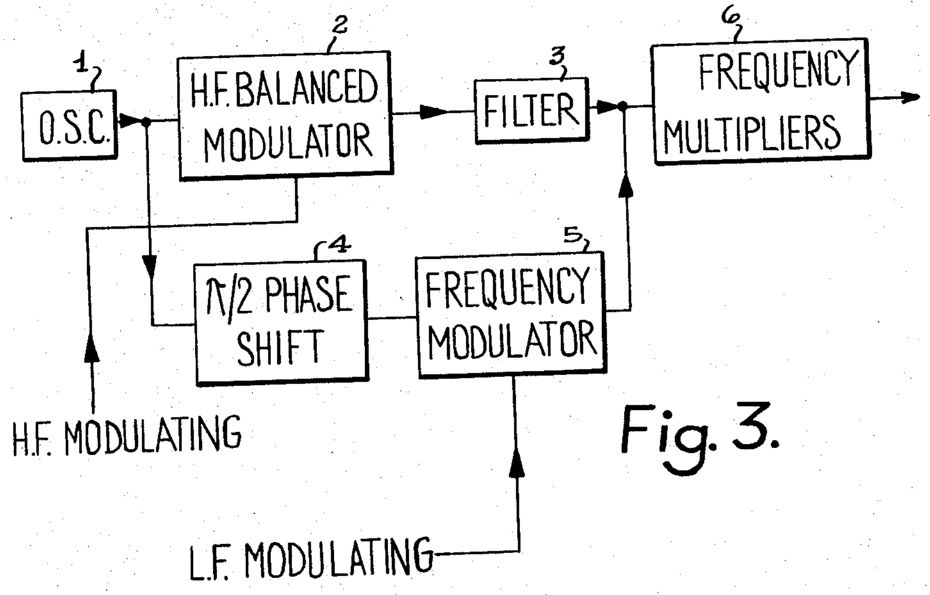
FIG. 3 shows how the phase modulator of FIG. 2 would be modified in accordance with the invention.

FIG. 3 shows a modification of FIG. 2 designed to avoid this difficulty in which in the first chanel the high frequency modulating signals are introduced into the balanced modulator 2 where they are amplitude modulated and after which the carrier is removed by a filter as in FIG. 1. The low frequency modulating signals are applied to a frequency modulator 5 in the second channel which has a 90° phase shift 4. The high and low frequency modulated signals are then added after which they are passed to the frequency multiplier 6. Such an arrangement can be used for the transmission shown graphically in FIG. 1. The low frequency modulation will consist in applying the E.O.W. signals.

Figure 4:
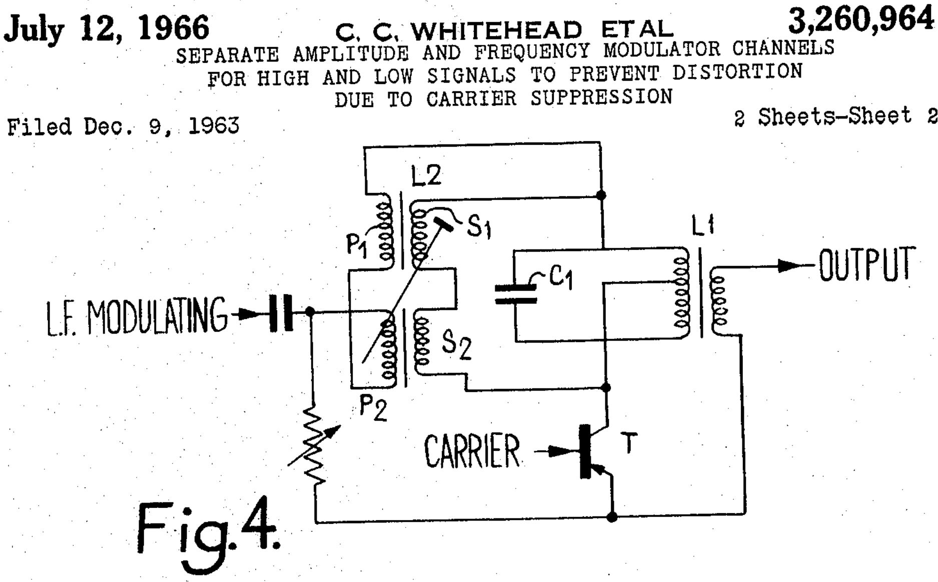
FIGS. 4, 5 and 6 are circuit arrangements showing three forms of phase modulator for the LF modulation in the arrangement of FIG. 3.

FIG. 4 shows one form of frequency modulating circuit which could be employed in the arrangement of FIG. 3. The carrier is applied to the transistor T as shown which in turn energises a tuned circuit L1, C1 providing the output. The modulation is applied through the left hand terminal to primary winding P1, P2 of the transformer L2, the secondary of which transformer is connected across the tuned circuit L1, C1. Clearly the modulating signal will vary the tuning of L1, C1 and hence the phase of the signal delivered at the output.

Figure 5:
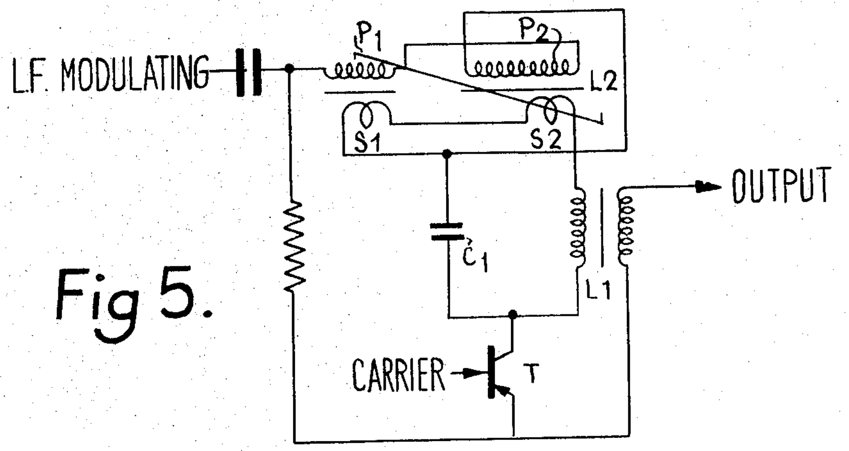

FIG. 5 shows a circuit similar to FIG. 4 but in this case the secondary windings S1, S2 of the modulating transformer L2 are in series with the tuned circuit L1, C1 instead of in parallel as in FIG. 4.

Figure 6:
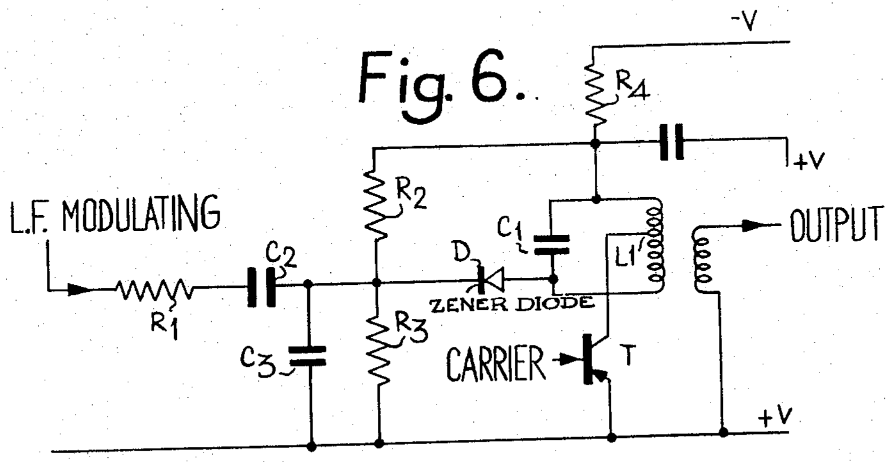

FIG. 6 shows a further modulating circuit using a variable capacity zener diode D. This, in the circuit shown, acts as a variable capacitor and again varies the tuning of the tuned circuit L1, C1 and hence the phase of the output signal in accordance with the modulating signal.

What we claim is:

1. A modulating circuit including means for feeding a carrier signal to parallel channels said channels including a first chanel comprising means for amplitude modulating the carrier with relatively high frequency modulating signals and a filter for removing the carrier but not the side bands, a second channel comprising a $\pi/2$ phase shifting network and means for frequency modulating the carrier with relatively low frequency modulating signals and means for combining the outputs of the two channels.

2. A modulating circuit including means for feeding a carrier signal to parallel channels said channels including a first channel comprising means for amplitude modulating the carrier with relatively high frequency modulating signals and a filter for removing the carrier but not the side bands, a second channel comprising a $\pi/2$ phase shifting network and means for frequency modulating the carrier with relatively low frequency modulating signals and means for combining the outputs of the two channels and means for frequency multiplying the combined outputs of the two channels.

3. In a radio transmitter a modulator having first and second parallel channels, means for feeding a carrier signal simultaneously to said channels, said first channel including an amplitude modulator fed with relatively high frequency modulating signals and a carrier suppressing filter and said second channel comprising a $\pi/2$ phase shifting network and a frequency modulator fed with relatively low frequency modulating signals and a frequency multiplying circuit fed with the combined output from said channels.

4. In a radio transmitter a modulator having first and second parallel channels, means for feeding a carrier signal simultaneously to said channels, said first channel including an amplitude modulator fed with relatively high frequency modulating signals and a carrier suppressing filter and said second channel comprising a $\pi/2$ phase shifting network and a frequency modulator fed with relatively low frequency modulating signals and a frequency multiplying circuit fed with the combined output from said channels, said frequency multiplier including a tuned circuit, means for feeding the carrier signal to excite said tuned circuit and means for feeding the modulating signal to vary the phase of the output signal from said tuned circuit.

References Cited by the Examiner

UNITED STATES PATENTS 3,162,729 12/1964 Holt ______________ 332—21 X

ROY LAKE, *Primary Examiner.*

ALFRED L. BRODY, *Examiner.*